(12) United States Patent
Hsu (10) Patent No.: US 11,801,908 B2
(45) Date of Patent: Oct. 31, 2023

(54) BICYCLE HOLDING DEVICE

(71) Applicant: YUEN I INDUSTRIAL CO., LTD., Fu Hsing Town (TW)

(72) Inventor: Chiao-Lin Hsu, Fu Hsing Town (TW)

(73) Assignee: YUEN I INDUSTRIAL CO., LTD., Fu Hsing Town (TW)

( * ) Notice: Subject to any disclaimer, the term of this patent is extended or adjusted under 35 U.S.C. 154(b) by 347 days.

(21) Appl. No.: 17/166,602

(22) Filed: Feb. 3, 2021

(65) Prior Publication Data

US 2021/0237816 A1 Aug. 5, 2021

(30) Foreign Application Priority Data

Feb. 4, 2020 (TW) ................................. 109103374

(51) Int. Cl.
*B62H 3/12* (2006.01)

(52) U.S. Cl.
CPC ..................... *B62H 3/12* (2013.01)

(58) Field of Classification Search
CPC ... B62H 3/12; B62H 3/00; B62H 3/02; B62H 3/04; B62H 3/10; B62H 3/06; A47B 57/32; A47B 57/34; A47B 47/0083; A47B 57/265; A47B 57/545; A47F 5/04
See application file for complete search history.

(56) References Cited

U.S. PATENT DOCUMENTS

| 570,465 | A | * | 11/1896 | Hayes | B62H 3/12 |
| | | | | | 211/47 |
| 4,925,204 | A | * | 5/1990 | Lugo | B62H 3/00 |
| | | | | | 359/523 |
| 6,068,143 | A | * | 5/2000 | Wang | A47B 57/265 |
| | | | | | 211/187 |
| 6,283,310 | B1 | * | 9/2001 | Dean | B60R 9/10 |
| | | | | | 211/20 |
| 6,679,388 | B1 | * | 1/2004 | Chiu | B62H 3/12 |
| | | | | | 248/170 |
| 6,843,380 | B1 | * | 1/2005 | Fickett | B62H 3/06 |
| | | | | | 211/17 |
| 6,983,853 | B1 | * | 1/2006 | Fickett | A47F 7/00 |
| | | | | | 248/303 |
| 8,528,748 | B2 | * | 9/2013 | Shaha | B62H 3/12 |
| | | | | | 211/17 |
| 10,750,859 | B1 | * | 8/2020 | Fickett | A47F 5/083 |
| 11,046,380 | B1 | * | 6/2021 | Gu | B62H 3/12 |

(Continued)

FOREIGN PATENT DOCUMENTS

| TW | M417291 U | 12/2011 |
| TW | 201318910 A | 5/2013 |
| TW | M459159 U | 8/2013 |

*Primary Examiner* — Hiwot E Tefera
(74) *Attorney, Agent, or Firm* — Birch, Stewart, Kolasch & Birch, LLP (57) ABSTRACT

A bicycle holding device for holding a bicycle that has a perforation at the bottom end of each of the left and right fork blades of the front fork thereof is disclosed to include a bicycle holder frame settable on the ground or wall, and a front fork support rod located in the bicycle holder frame and passing through the perforations of the left and right fork blades of the front fork. Thereby, the bicycle holding device of the present invention can allow the user to easily complete bicycle parking, and can provide good stability after the completion of the parking.

2 Claims, 13 Drawing Sheets

(56) References Cited

U.S. PATENT DOCUMENTS

| | | | | |
|---|---|---|---|---|
| 2003/0042826 A1* | 3/2003 | Felsenthal | ............ | D06F 95/002 108/92 |
| 2015/0068994 A1* | 3/2015 | Kerman | ............... | A47B 57/562 248/676 |
| 2017/0274829 A1* | 9/2017 | Huebner | .................... | B60R 9/06 |
| 2018/0317651 A1* | 11/2018 | Tang | .................... | A47B 57/545 |
| 2019/0343277 A1* | 11/2019 | Sabounjian | ........ | A47B 47/0083 |

* cited by examiner

BICYCLE HOLDING DEVICE

BACKGROUND OF THE INVENTION

1. Field of the Invention

The present invention relates to bicycle technology and more particularly, to such a bicycle holding device.

2. Description of the Related Art

Due to the popularity of bicycles, almost every household has at least one bicycle. However, the problem that is often troubled by the public is that the space in general buildings or apartments is limited, which will occupy a lot of indoor space when parking bicycles. If the bicycle is parked in the stairwell, it will also cause public security problems.

In order to solve the bicycle parking problem, related patent documents such as Taiwan utility model patent No. M459159, No. M417291 and No. 201318910 reveal different bicycle parking frames. However, the common problem of the aforementioned patent documents is the lack of stability, that is, when the bicycle is impacted by improper external force, it is easy to slip off the bicycle parking frame. In addition to causing some parts to hit the ground and damage, it is also likely to hurt surrounding personnel. Therefore, the aforementioned patent documents still have room for improvement in terms of stability.

SUMMARY OF THE INVENTION

The present invention has been accomplished under the circumstances in view. It is the main object of the present invention to provide a bicycle holding device, which can make the bicycle have good stability after parking.

To achieve this and other objects of the present invention, the bicycle to which the bicycle holding device of the present invention is applied comprises a front fork. The front fork comprises opposing left and right fork blades, and the bottom end of each fork blade has a perforation. The bicycle holding device of the present invention comprises a bicycle holder frame and a front fork support rod. The bicycle holder frame can be erected on the ground or fixed on the wall according to actual needs. The front fork support rod is set in the bicycle holder frame and is detachably installed in the perforations of the two fork blades of the front fork.

It can be seen from the above that the front wheel is removed before parking, then the front fork support rod is inserted into the two perforations, and finally the front fork support rod is set in the bicycle holder frame to complete the parking. Thereby, the bicycle holding device of the present invention can allow the user to easily complete the parking, and can provide good stability to the bicycle after completing the parking.

Preferably, the bicycle holder frame comprises an upright tube, two foot bars and a hook set. The foot bars are connected to the bottom end of the upright tube for support on the ground. The hook set comprises a first sleeve and a hook. The first sleeve is sleeved onto the upright tube and can be moved up and down or rotated relative to the upright tube. The hook has one end thereof fixed to the first sleeve, and an opposite end thereof configured for hooking the front fork support rod. With the above technical features, the user puts the front fork support rod through the two perforations, and then hooks the front fork support rod to the hook to complete the parking. Before hooking the front fork support rod to the hook, you can adjust the height of the first sleeve according to the size of the bicycle.

Preferably, the bicycle holder frame comprises a pole and a hook set. The pole has a plurality of insertion slots arranged at intervals from top to bottom. The hook set comprises a bearing plate and a hook. The bearing plate comprises a plug-in portion. The bearing plate is clamped to one of the insertion slots of the pole by the plug-in portion, so that the bearing plate has a height-adjustable function, and one end of the hook is fixed on the bearing plate. The other end of the hook hooks the front fork support rod. With the above technical features, the user puts the front fork support rod through the two perforations, and then hooks the front fork support rod to the hook to complete the parking. Before hooking the front fork support rod to the hook, you can adjust the height of the bearing plate according to the size of the bicycle.

Preferably, the bicycle holder frame comprises a beam and a hook set. The beam is fixed on the wall and has a sliding groove. The hook set comprises a first slide and a hook. The first slide is mounted in the sliding groove of the beam and can be moved horizontally along the sliding groove. The hook has one end thereof fixed to the first slide, and an opposite end thereof configured for hooking the front fork support rod. With the above technical features, the user puts the front fork support rod through the two perforations, and then hooks the front fork support rod to the hook to complete the parking. Before hooking the front fork support rod to the hook, you can adjust the left and right position of the hook through the first slide.

Preferably, the bicycle holder frame comprises an upright tube, two foot bars, and a first sleeve. The foot bars are connected to the bottom end of the upright tube for support on the ground. The first sleeve is sleeved onto the upright tube and can be moved up and down or rotated relative to the upright tube. The front fork support rod has one end thereof fixed to the first sleeve. With the above technical features, the user puts the front fork support rod through the two perforations, and then sleeves the first sleeve onto the upright tube to complete the parking.

Preferably, the bicycle holder frame comprises an upright tube and a hook set. The upright tube has a ring groove. The hook set comprises a first sleeve and a hook. The first sleeve is sleeved onto the upright tube and positioned in the ring groove of the upright tube. The hook has one end thereof fixed to the first sleeve, and an opposite end thereof hooked on any part of the bicycle.

Preferably, the bicycle holding device comprises a bicycle holder frame and a hook set. The bicycle holder frame comprises four upright tubes and a plurality of floor plates. The floor plates are spaced up and down and are supported by the four upright tubes. The hook set has one end thereof vertically movably and rotatably coupled to one upright tube, and an opposite end thereof hooked on any part of the bicycle.

Preferably, the hook set comprises a first sleeve and a hook. The hook has one end thereof fixed to the first sleeve, and an opposite end thereof hooked on any part of the bicycle.

The detailed structure, characteristics, assembly or use of the bicycle holding device provided by the present invention will be described in the detailed description of the subsequent preferred embodiments. However, those with ordinary knowledge in the field of the present invention should be able to understand that the detailed description and the specific embodiments listed in the implementation of the

DETAILED DESCRIPTION OF THE INVENTION

The applicant first explains here that throughout the specification, including the following preferred embodiments and claims in the scope of the patent application, the nouns related to directionality are based on the directions in the drawings. Secondly, in the preferred embodiments and drawings that will be introduced below, the same element numbers represent the same or similar elements or their structural features.

Figure 1:
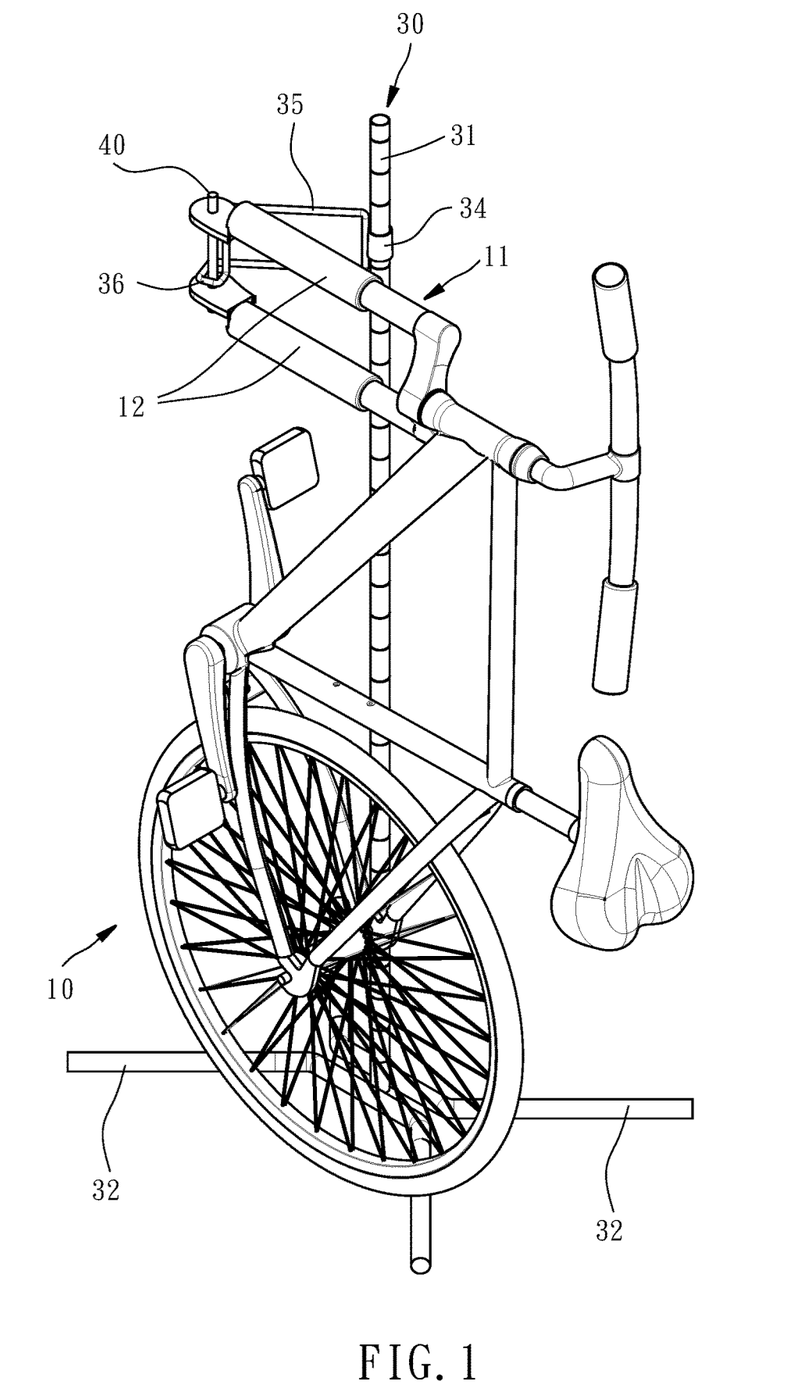
FIG. 1 is an elevational view of a bicycle holding device in accordance with a first embodiment of the present invention.
Figure 2:
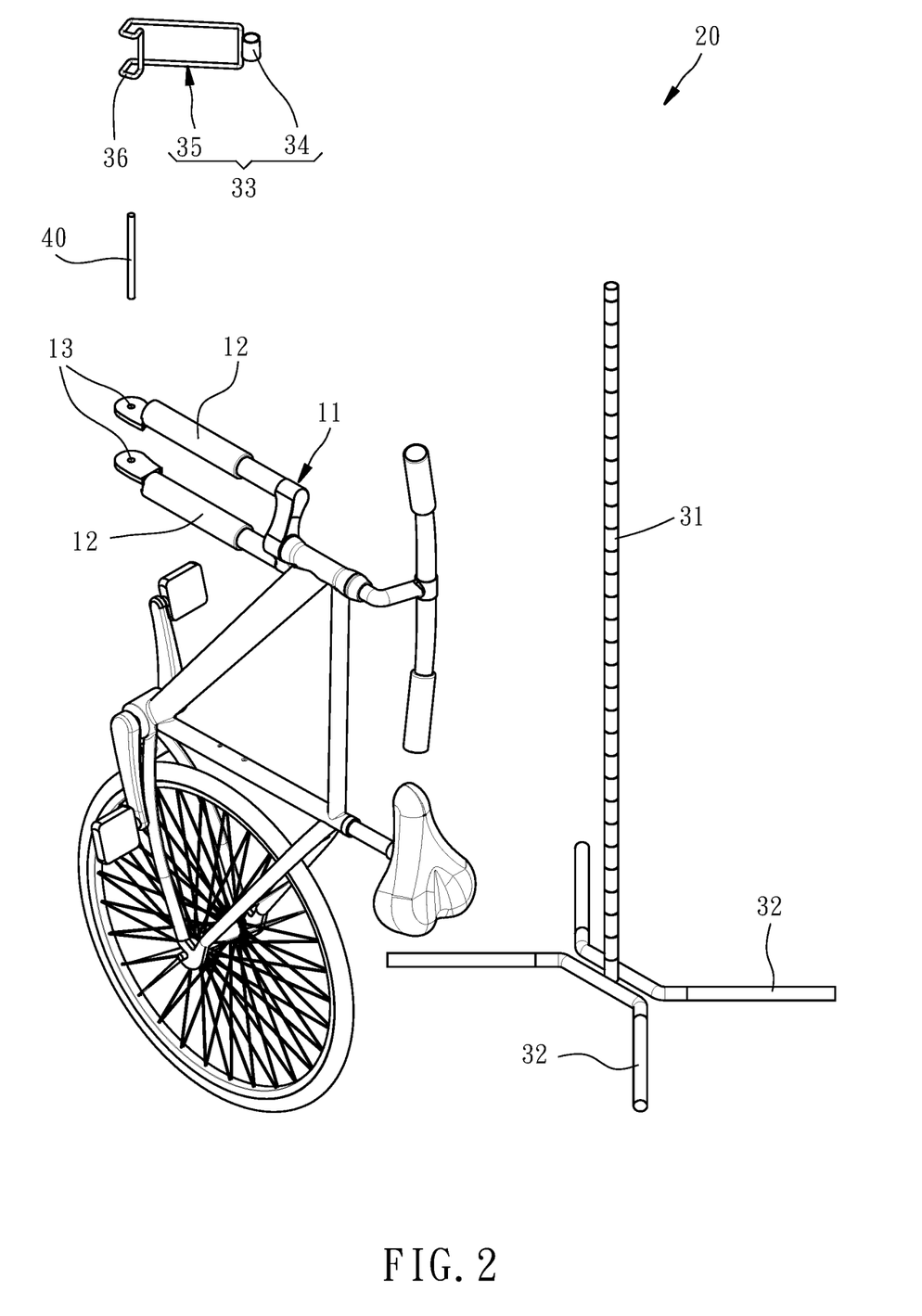
FIG. 2 is an exploded view of the bicycle holding device shown in FIG. 1.
Figure 3:
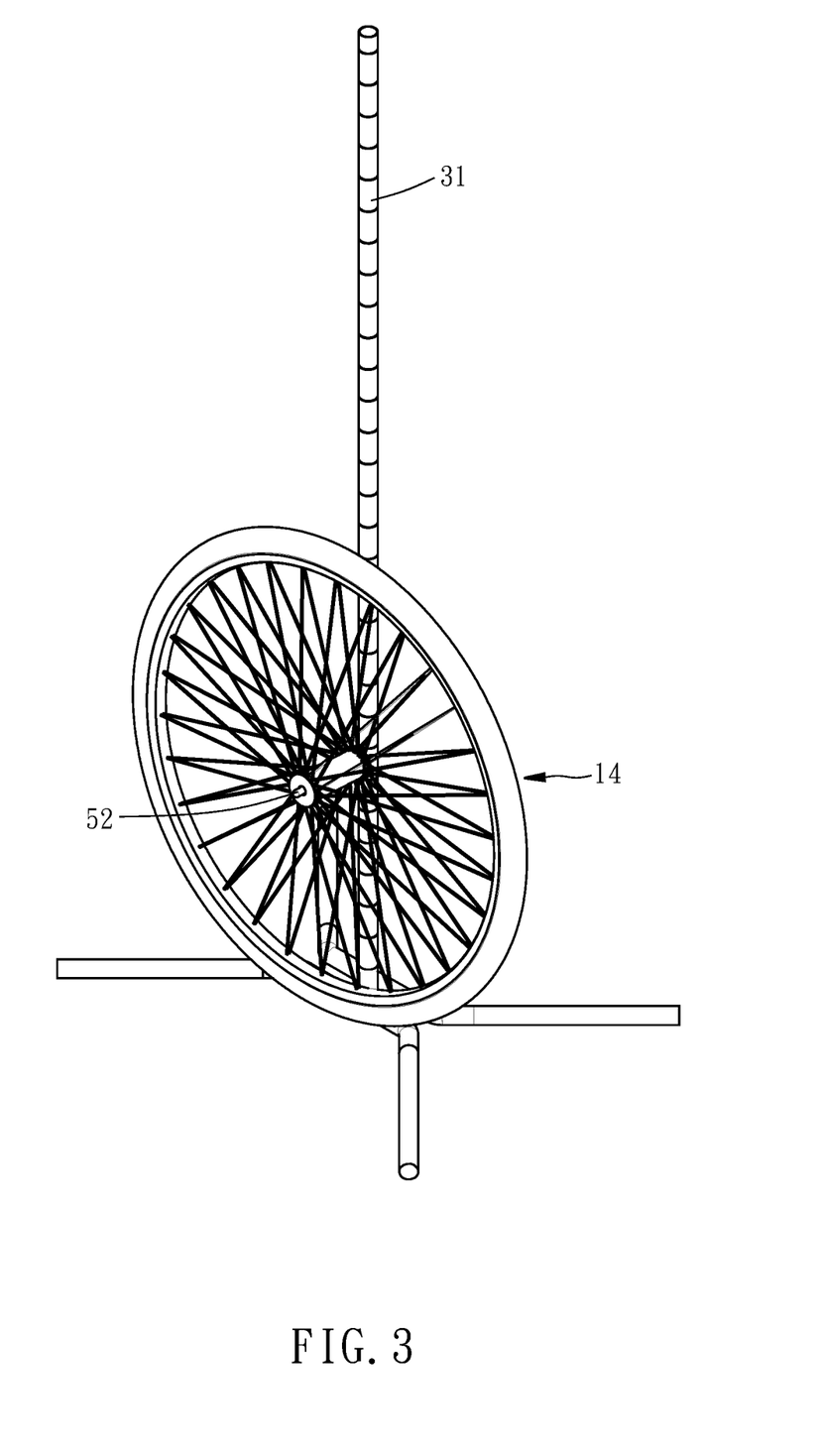
FIG. 3 is an elevational view of the bicycle holding device used in conjunction with the front wheel in accordance with the first embodiment of the present invention.

Referring to FIGS. 1-3, the bicycle 10 to which the present invention is applied comprises a front fork 11 and a front wheel 14. The front fork 11 comprises opposing left and right fork blades 12, and the bottom end of each fork blade 12 has a perforation 13. The front wheel 14 has a wheel axle hole 15, so that the front wheel 14 can be set between the left and right fork blades 12 through a barrel shaft means that penetrates the left and right perforation 13 and the wheel axle hole 15. Please continue to refer to FIGS. 1 and 2, the bicycle holding device 20 of the first embodiment of the present invention comprises a bicycle holder frame 30 and a front fork support rod 40.

The bicycle holder frame 30 in this embodiment comprises an upright tube 31, two foot bars 32, and a hook set 33. The foot bars 32 are connected to the bottom end of the upright tube 31 for support on the ground. The hook set 33 comprises a first sleeve 34 and a hook 35. The first sleeve 34 is sleeved onto the upright tube 31 and can move up and down along the axis of the upright tube 31 or rotate around the axis of the upright tube 31. One end of the hook 35 is fixed to the first sleeve 34 by welding, and the other end of the hook 35 has a hook portion 36. The front fork support rod 40 is the aforesaid barrel shaft means in this embodiment. The front fork support rod 40 passes through the perforations 13 of the left and right fork blades 12 of the front fork 11 and can be fixed by the hook portion 36 of the hook 35.

It can be seen from the above that when you want to park the bicycle, first remove the front wheel 14 and then pass the front fork support rod 40 axially through the perforations 13 of the two fork blades 12 of the front fork 11 in parallel to the upright tube 31. Then, sleeve the first sleeve 34 onto the upright tube 31, and adjust the height and angle of the hook 35 through the first sleeve 34, and finally hook the front fork support rod 40 to the hook portion 36 of the hook 35 to complete the parking.

Figure 4:
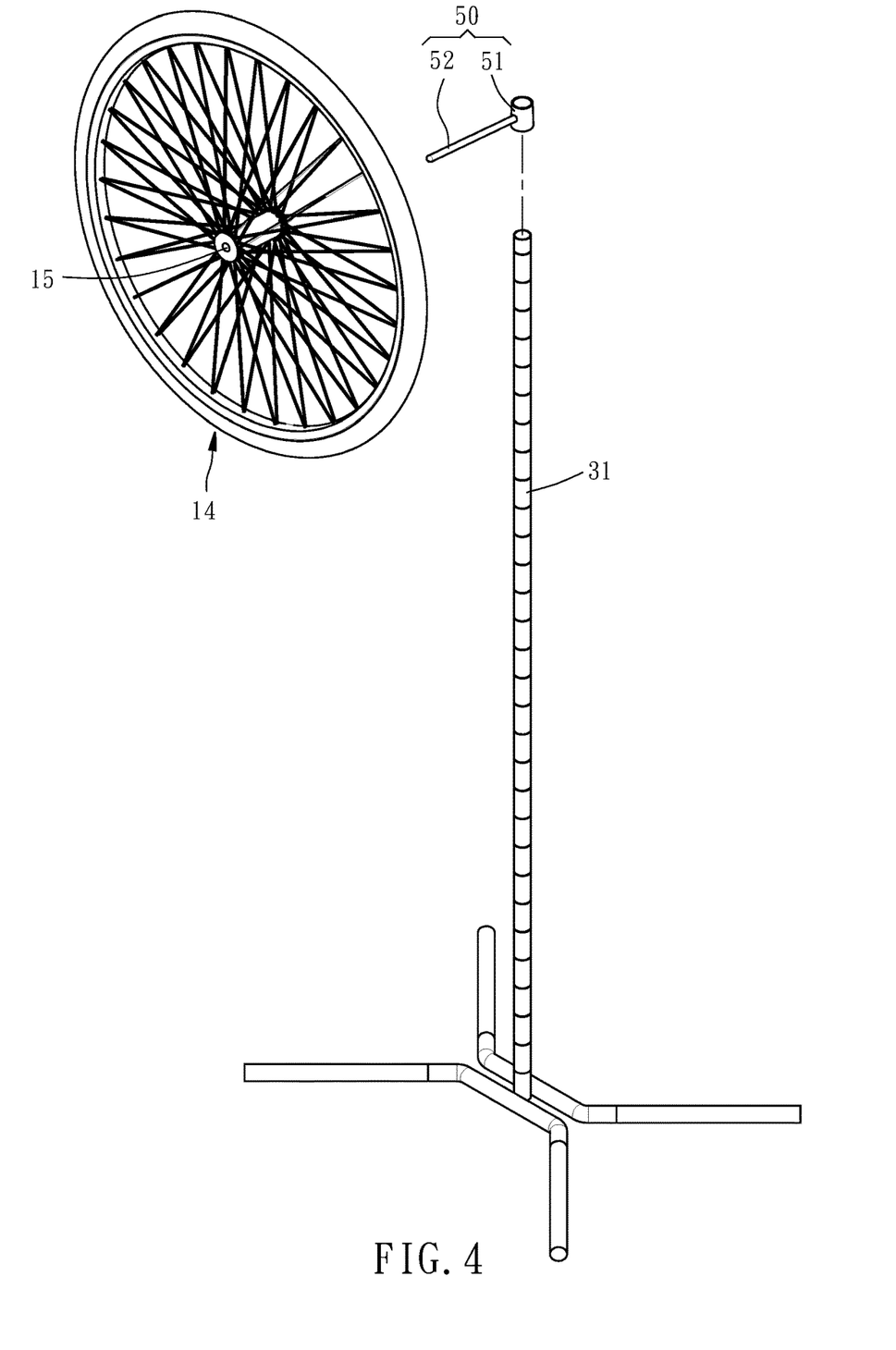
FIG. 4 is an exploded view of FIG. 3.
Figure 5:
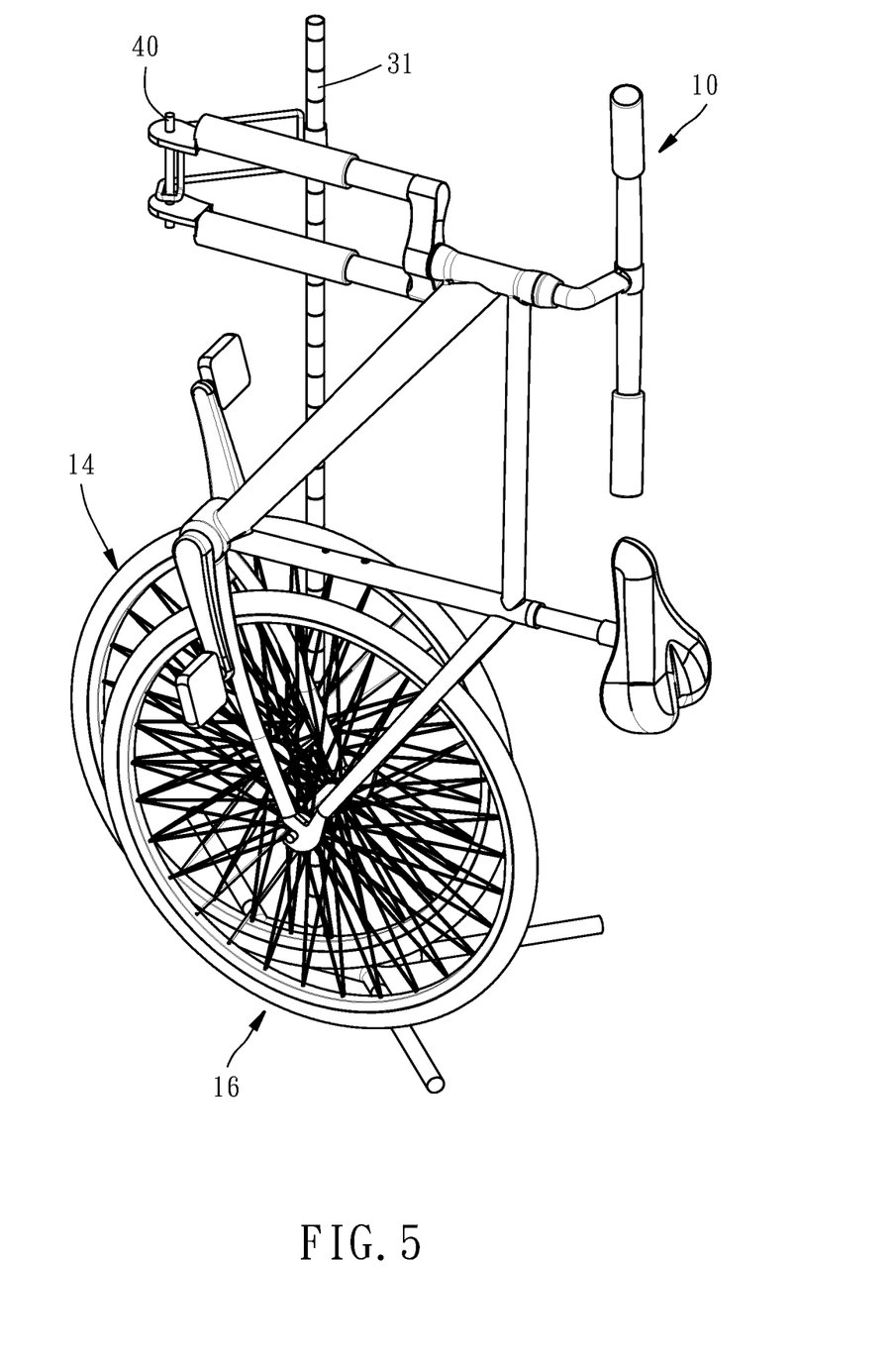
FIG. 5 is an elevational view of the bicycle holding device used in conjunction with the bicycle frame and the front wheel in accordance with the first embodiment of the present invention.

In order to allow the front wheel 14 to be centrally placed, the first embodiment of the present invention further provides a front wheel support device 50. As shown in FIGS. 3 and 4, the front wheel support device 50 comprises a second sleeve 51 and a front wheel support rod 52. The second sleeve 51 is sleeved onto the upright tube 31, and can move up and down along the axis of the upright tube 31 or rotate around the axis of the upright tube 31. The front wheel support rod 52 has one end thereof fixed to the second sleeve 51 by welding. In this way, after the front wheel 14 is removed, the position of the front wheel support rod 52 can be adjusted by rotating the second sleeve 51 to avoid interference with other parts of the bicycle 10 (such as the rear wheel 16). Then set the wheel axle hole 15 of the front wheel 14 on the front wheel support rod 52, so that the removed front wheel 14 can be placed in the upright tube 31 together with the bicycle 10, as shown in FIG. 5, to save storage space.

Figure 6:
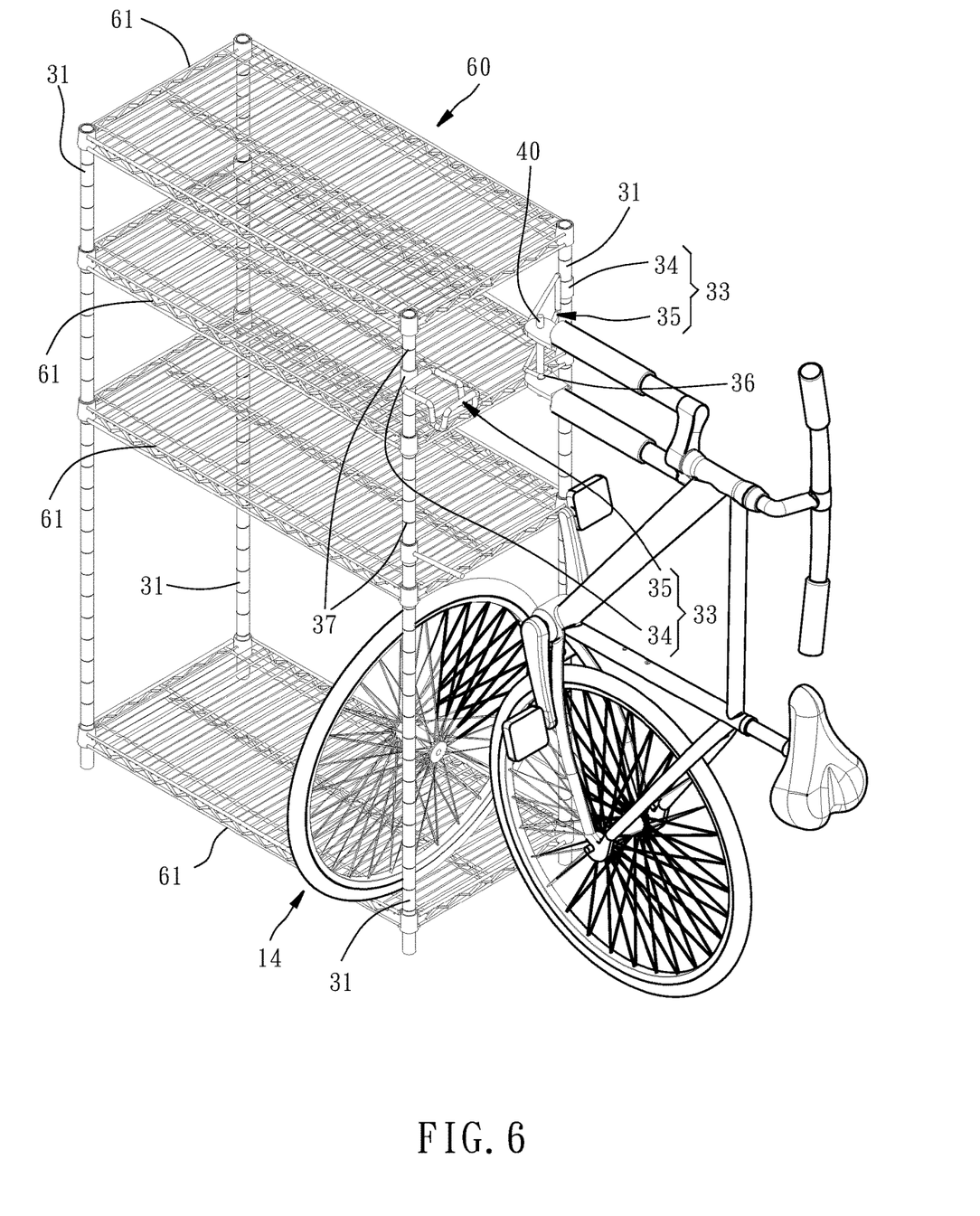
FIG. 6 is an elevational view of a bicycle holding device in accordance with a second embodiment of the present invention.

On the other hand, the present invention can have different structural changes. Please refer to FIG. 6, in the second embodiment of the present invention, the bicycle holder frame 60 comprises four upright tubes 31, four floor plates 61 and one hook set 33. The four floor plates 61 are arranged in a spaced manner up and down, and their four corners are sleeved on the four upright tubes 31, so that the four floor plates 61 are jointly supported by the four upright tubes 31. As for the structure of hook set 33, it is the same as the first implementation above, that is, it comprises a first sleeve 34 and a hook 35. Therefore, before installing each floor plate 61, the first sleeve 34 can be sleeved onto one upright tube 31, and the height and angle of the hook 35 can be adjusted through the first sleeve 34, and then the remaining floor plates 61 can be set on the four upright tubes 31, and finally hook the front fork support rod 40 to the hook portion 36 of the hook 35 to complete the parking. The disassembled front wheel 14 can be placed flat on any floor plate 61, or it can be leaned against any one of the upright tubes 31 for easy access. In addition, one or more ring grooves 37 are provided on each upright tube 31, and the ring grooves 37 are spaced apart from each other. The first sleeve 34 of the hook set 33 is sleeved on the selected upright tube 31 and can be optionally positioned on any ring groove 37 of the selected upright tube 31 (for example, a protrusion is provided on the inner wall of the first sleeve 34 to be engaged in the ring groove 37). One end of the hook 35 of the hook set 33 is fixed to the first sleeve 34, and the other end of the hook 35 is hooked to any part of the bicycle.

Figure 7:
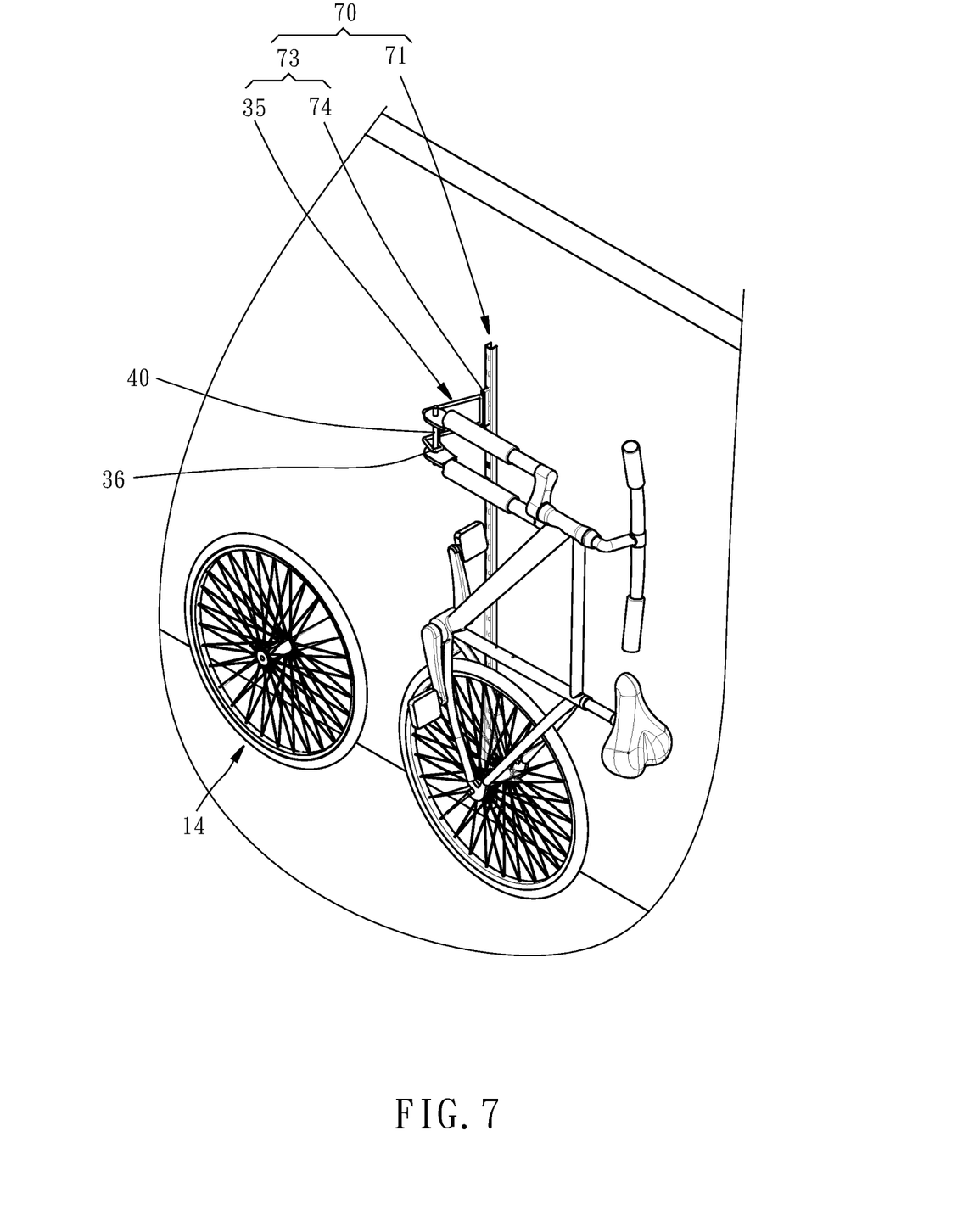
FIG. 7 is an elevational view of a bicycle holding device in accordance with a third embodiment of the present invention.
Figure 8:
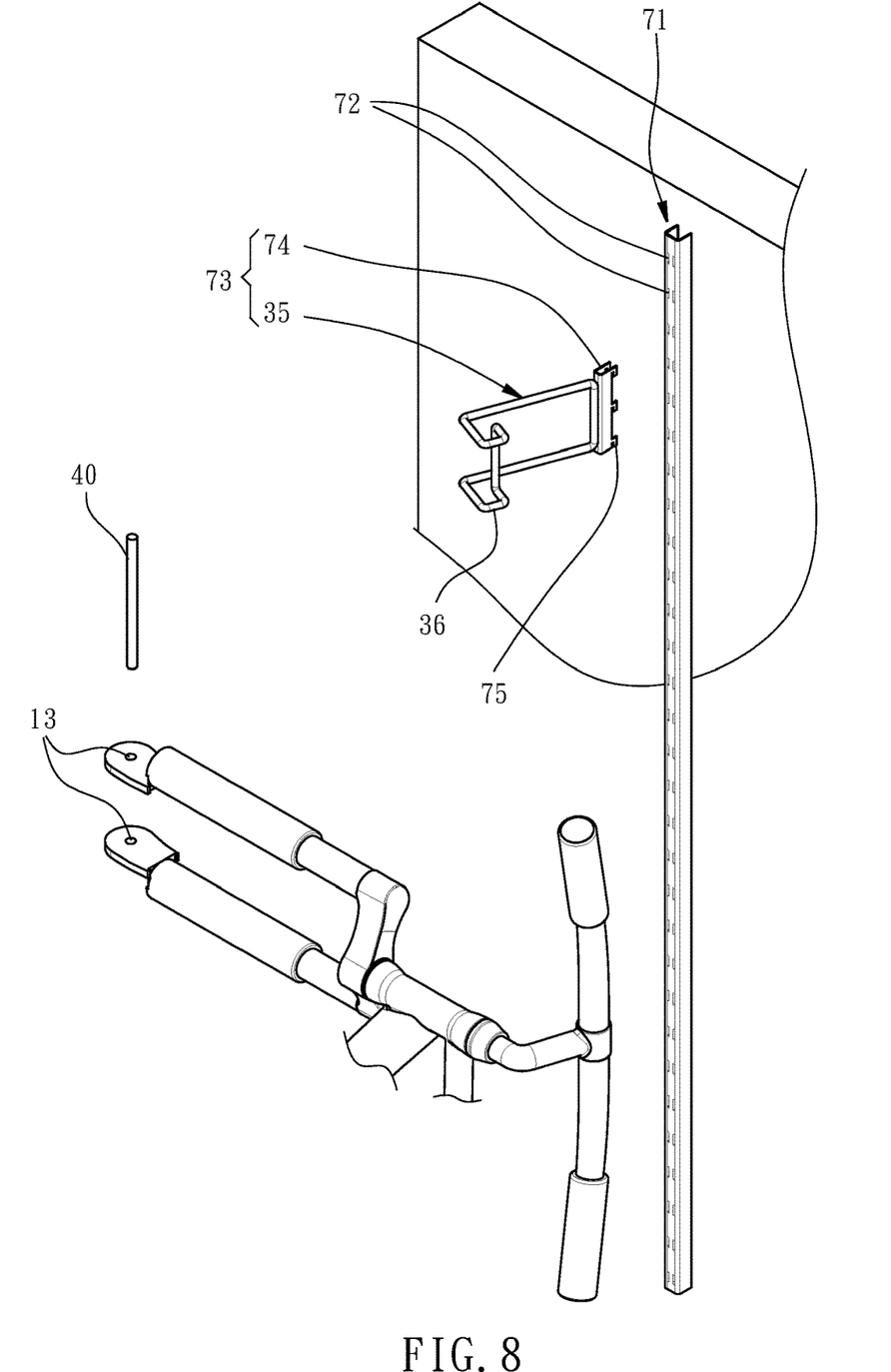
FIG. 8 is an exploded view of FIG. 7.

Referring to FIG. 7, in the third embodiment of the present invention, the bicycle holder frame 70 comprises a pole 71 and a hook set 73. The pole 71 is fixed on the wall and has pairs of insertion slots 72, which are arranged at equal intervals along the length direction of the pole 71. The hook set 73 comprises a bearing plate 74 and a hook 35. The bearing plate 74 comprises three pairs of plug-in portions 75. The hook 35 has one end thereof fixed to the bearing plate 74 by welding. With this, the three pairs of plug-in portions 75 of the bearing plate 74 are clipped to three pairs of insertion slots 72 of the pole 71, and the clip position of the bearing plate 74 can be changed to adjust the height of the hook 35. Then hook the front fork support rod 40 to the hook portion 36 of the hook 35 to complete the parking. As for the removed front wheel 14, you can lean it directly on the wall.

Figure 9:
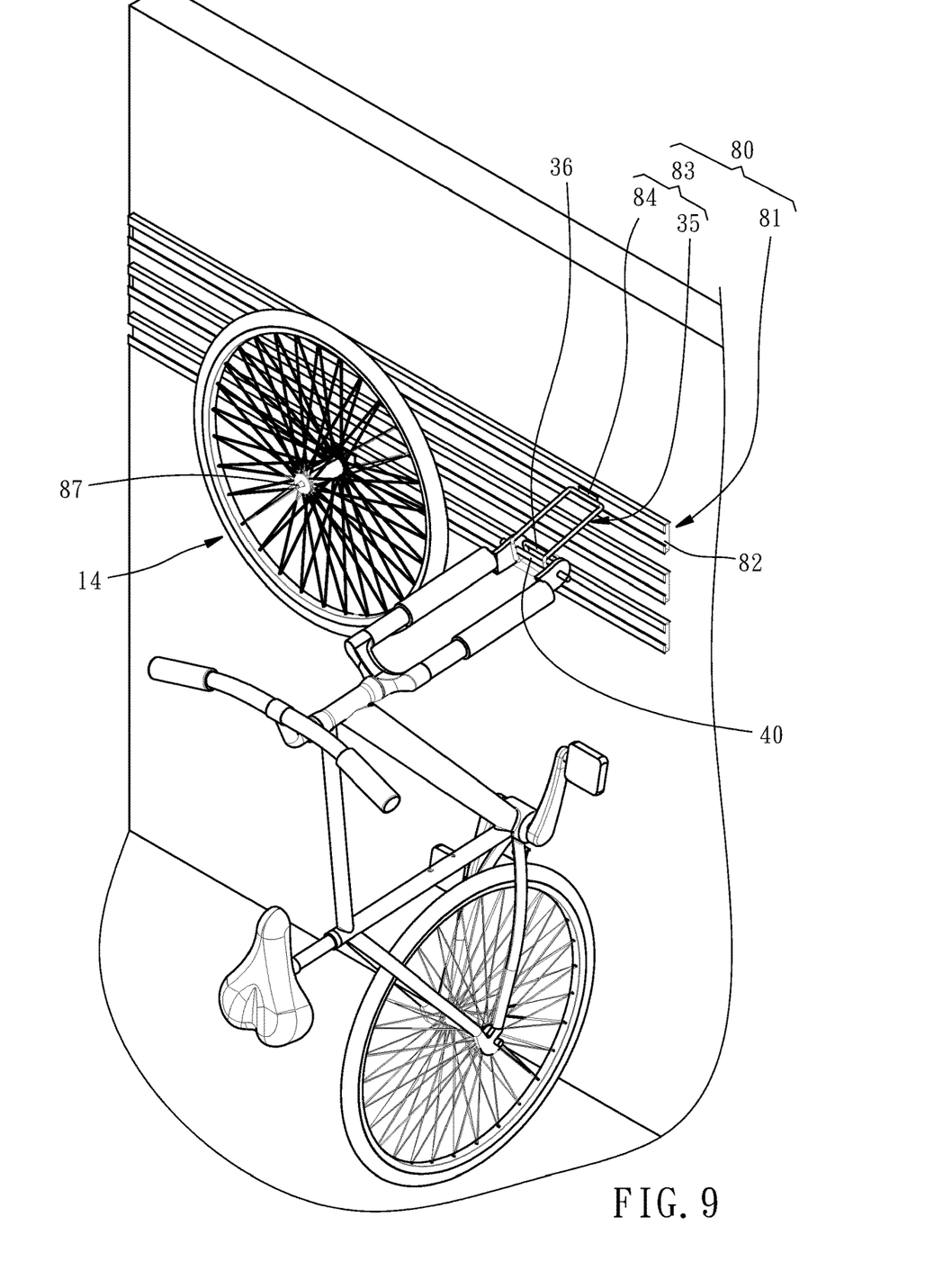
FIG. 9 is an elevational view of a bicycle holding device in accordance with a fourth embodiment of the present invention.
Figure 10:
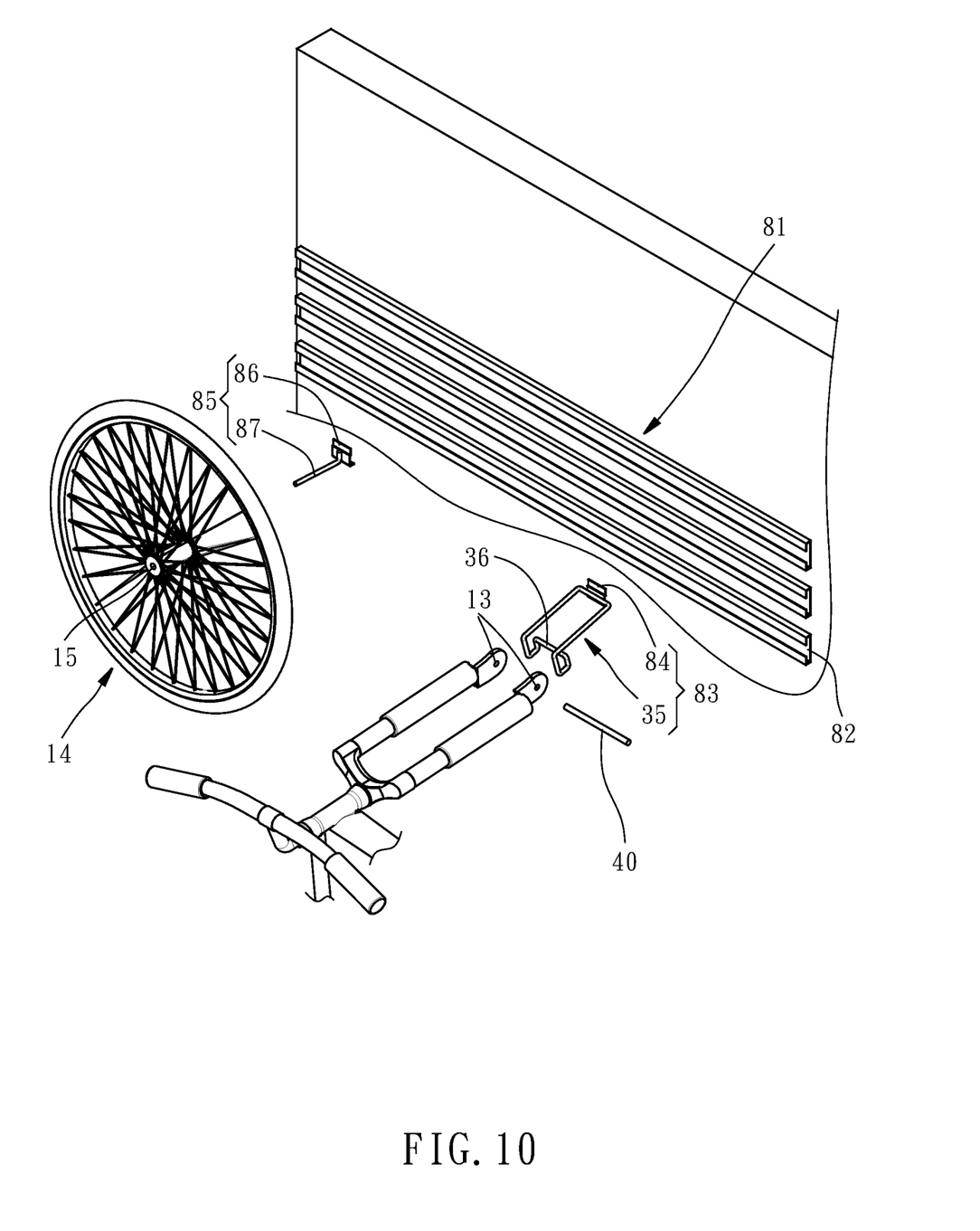
FIG. 10 is an exploded view of FIG. 9.

Referring to FIGS. 9 and 10, in the fourth embodiment, the bicycle holder frame 80 comprises three beams 81 and a hook set 83. The three beams 81 are fixed on the wall in parallel with each other. Each beam 81 has a sliding groove 82. The hook set 83 comprises a first slide 84 and a hook 35. The hook 35 has one end thereof fixed to the first slide 84 by welding. In this way, the first slide 84 is inserted in the sliding groove 82 of one of the beams 81, and the first slide 84 can be inserted in the sliding groove 82 of another beam 81 to adjust the height of the hook 35, and then hook the front fork support rod 40 to the hook portion 36 of the hook 35 to complete parking. The removed front wheel 14 can also be hung on one of the beams 81 through a front wheel support device 85. More specifically, the front wheel support device 85 provided by the fourth embodiment of the present invention comprises a second slide 86 and a front wheel support rod 87. The second slide 86 is inserted in the sliding groove 82 of one of the beams 81. The front wheel support rod 87 has one end thereof fixed to the second slide 86. Therefore, on the one hand, the height of the front wheel support rod 87 can be adjusted by inserting the second slide 86 in the sliding groove 82 of a different beam 81, and on the other hand, the position of the front wheel support rod 87 can be adjusted by the movement of the second slide 86 in the sliding groove 82 to avoid interference between the front wheel 14 and other parts of the bicycle 10 (such as the front fork 11) after being hung. Then attach the wheel axle hole 15 of the front wheel 14 onto the front wheel support rod 87, so that the front wheel 14 can be placed on the same beam 81 or two different beams 81 together with the bicycle 10 to save storage space.

Figure 11:
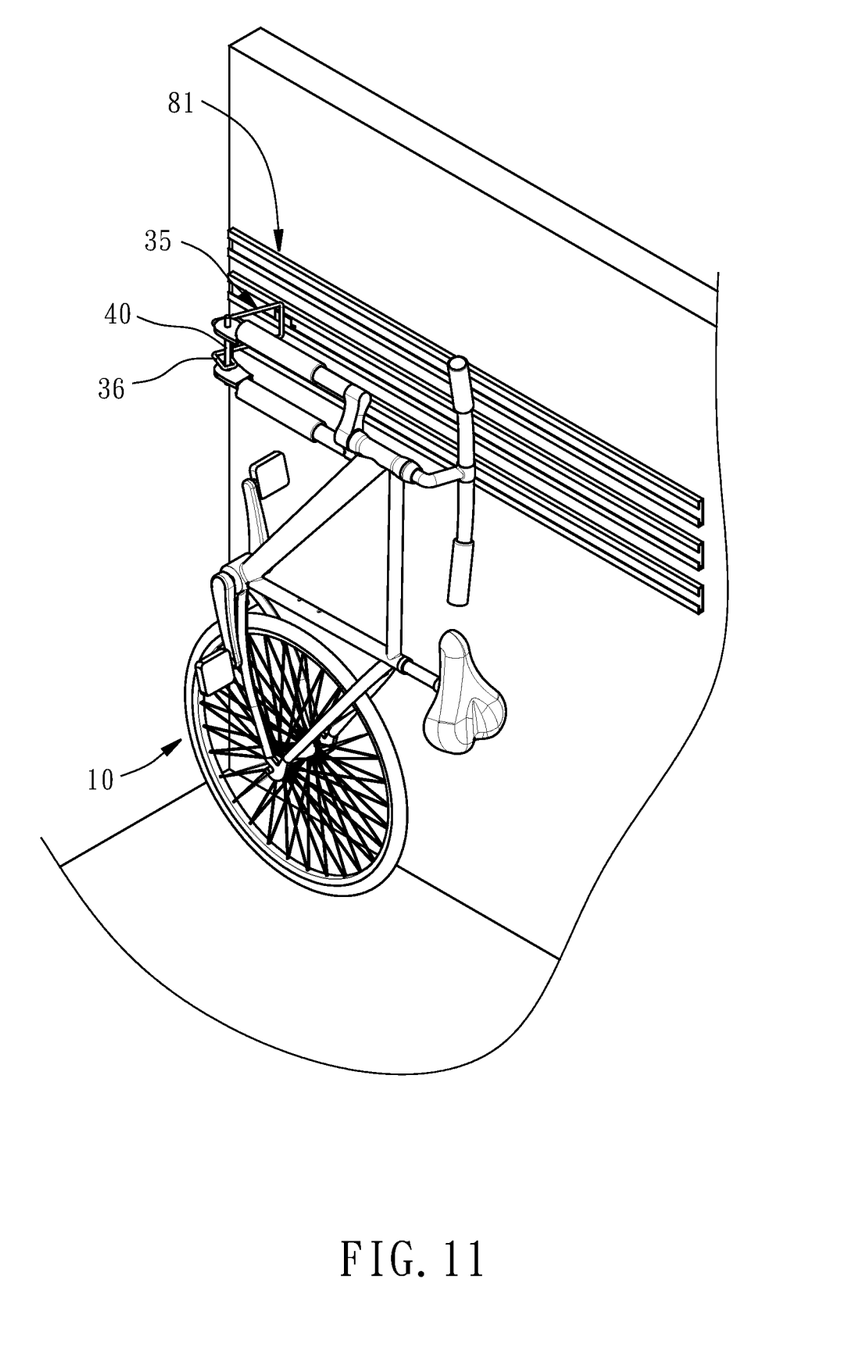
FIG. 11 is another elevational view of the bicycle holding device in accordance with the fourth embodiment of the present invention.

However, the way that the hook 35 is fixed to the first slide 84 can also be changed differently. For example, in FIG. 9, the hook portion 36 of the hook 35 faces downwards, so that the front fork support rod 40 is fixed to the hook portion 36 of the hook 35 in parallel to the beams 81. As for FIG. 11, since the hook portion 36 of the hook 35 faces right, the front fork support rod 40 is fixed to the hook portion 36 of the hook 35 in a direction perpendicular to the beams 81. In this way, the bicycle 10 can be closer to the wall to reduce the space occupied.

Figure 12:
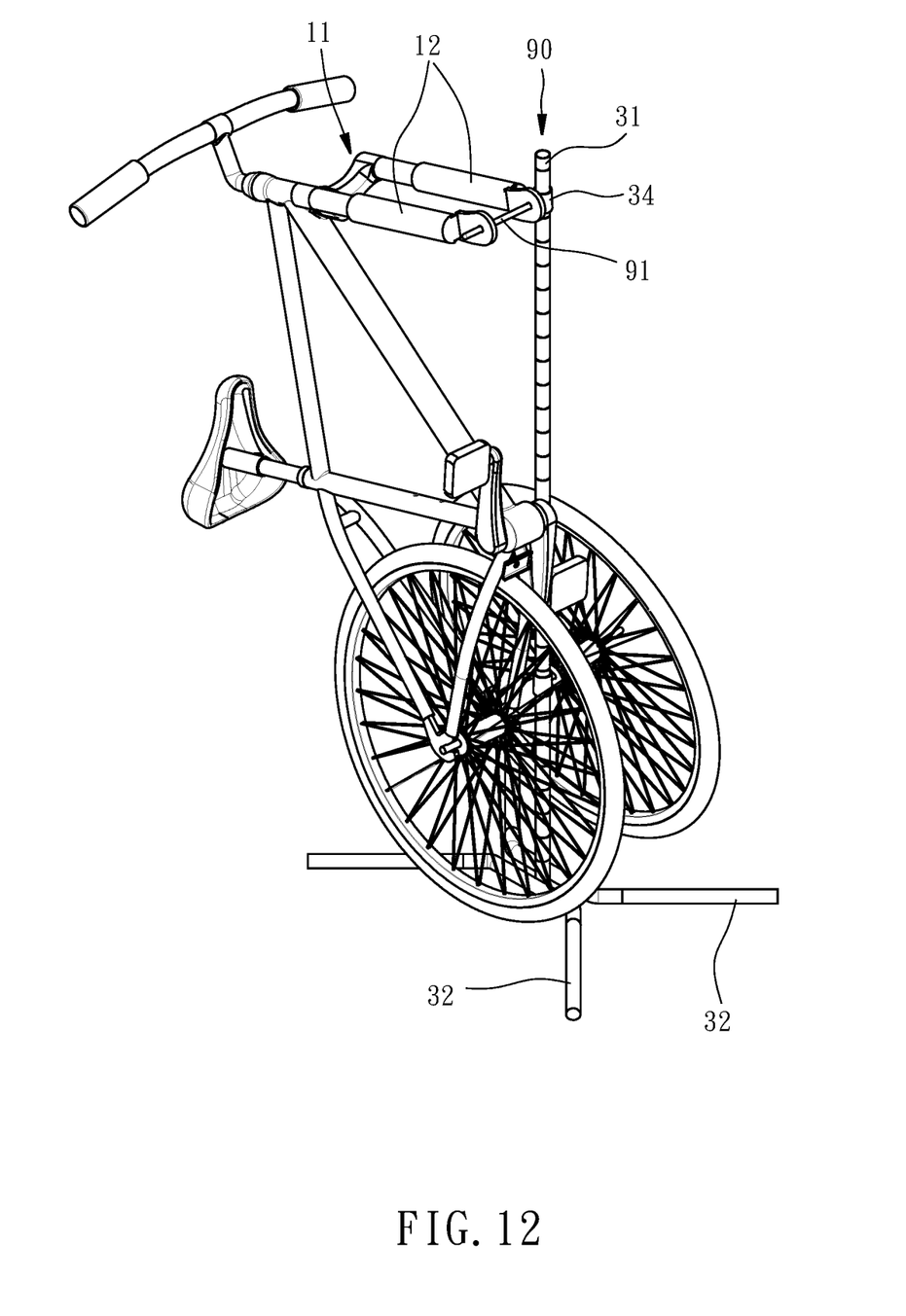
FIG. 12 is an elevational view of a bicycle holding device in accordance with a fifth embodiment of the present invention.
Figure 13:
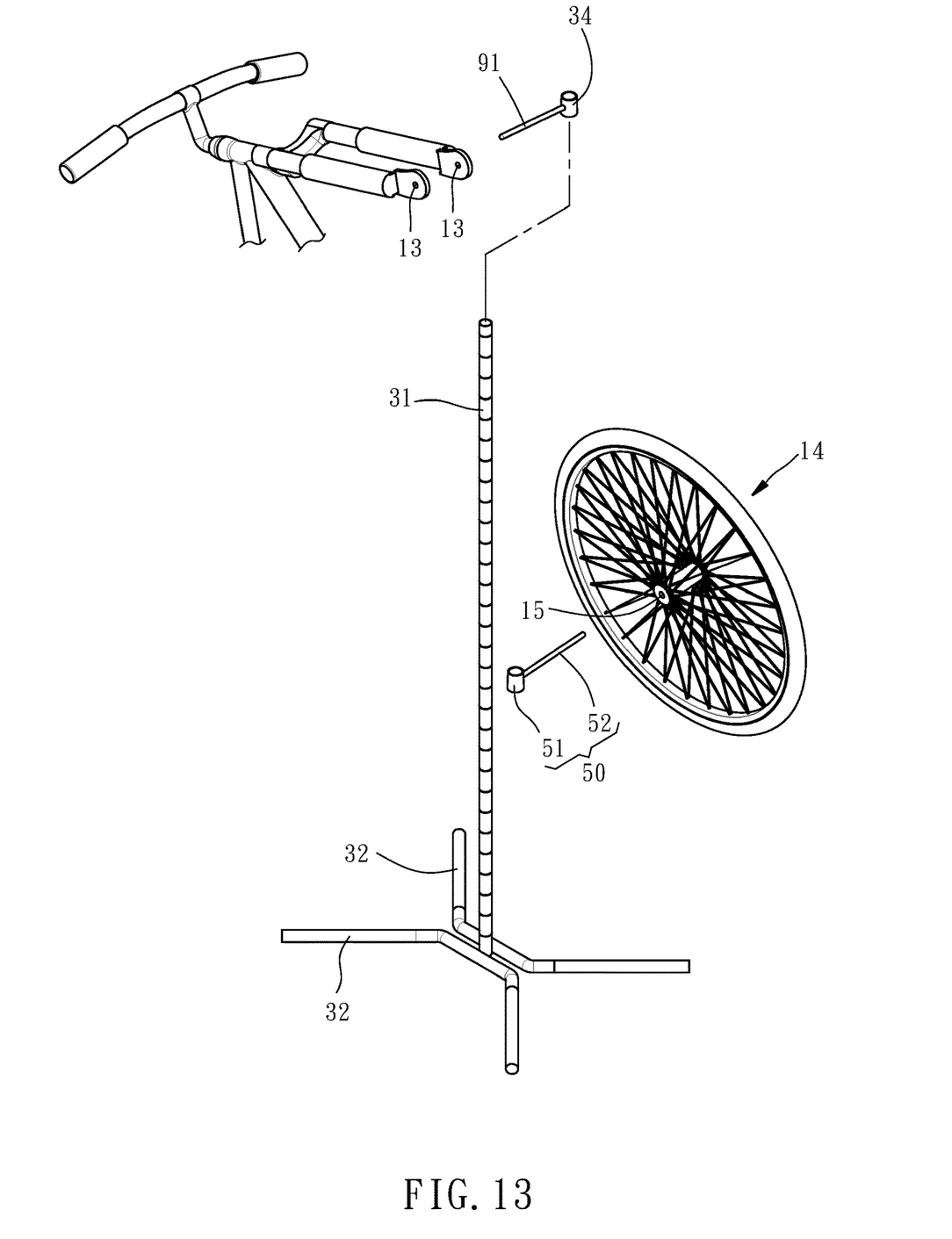
FIG. 13 is an exploded view of FIG. 12.

Referring to FIG. 12 and FIG. 13, in the fifth embodiment of the present invention, the bicycle holder frame 90 comprises an upright tube 31, two foot bars 32, and a first sleeve 34. The foot bars 32 are connected to the bottom end of the upright tube 31 for support on the ground. The first sleeve 34 is sleeved onto the upright tube 31 and can move up and down along the axis of the upright tube 31 or rotate around the axis of the upright tube 31. In addition, the front fork support rod 91 is not a barrel shaft means in this embodiment, it is a rod member fixed to the first sleeve 34 by welding. In this way, the front fork support rod 91 is inserted into the perforations 13 of the two fork blades 12 of the front fork 11 in a direction perpendicular to the axis of the upright tube 31. Then sleeve the first sleeve 34 onto the upright tube 31 to complete the parking. Since the first sleeve 34 can be moved up and down or rotated, it can be used with bicycles 10 of different sizes, and the position of the bicycle 10 can also be adjusted according to the placement space.

In addition, the fifth embodiment of the present invention can also provide a front wheel support device 50 that is the same as the first embodiment described above. Adjust the position of the front wheel support rod 52 by rotating the second sleeve 51 to avoid interference with other parts of the bicycle 10 (such as the rear wheel 16). Then attach the wheel axle hole 15 of the front wheel 14 onto the front wheel support rod 52, so that the front wheel 14 can be placed in the upright tube 31 together with the bicycle 10 to save storage space.

In summary, the bicycle holding device 20 of the present invention utilizes various combinations of bicycle holder frames 30, 60, 70, 80, 90 and front fork support rods 40, 91, which not only allows users to easily complete parking, but also after the parking is completed, it can provide good stability to the bicycle 10, which can ensure that the bicycle 10 is not easy to fall from the bicycle holder frame 30, 60, 70, 80, 90 when it is impacted by an external force, thereby protecting the bicycle 10 and the surrounding people.

What is claimed is:

1. A bicycle holding device for holding a bicycle, said bicycle comprising a front fork, a front fork support rod detachably inserted in two perforations of said front fork, and a front wheel detachably mounted to said front fork through said front fork support rod, said bicycle holding device comprising:
    a bicycle holder frame comprising a plurality of upright tubes arranged in parallel and a floor plate supported by said plurality of upright tubes; and
    a hook set, said hook set having one end thereof vertically movably and rotatably sleeved onto one of said plurality of upright tubes and an opposite end thereof configured for hooking on said front fork support rod of said bicycle;
    wherein when the front wheel is dissembled from said front fork, said dissembled front wheel is placed on said floor plate.

2. The bicycle holding device as claimed in claim 1, wherein said hook set comprises a first sleeve and a hook, said hook having one end thereof fixedly connected to said first sleeve and an opposite end thereof configured for hooking on said front fork support rod of said bicycle.

* * * * *